Figures 1, 2:
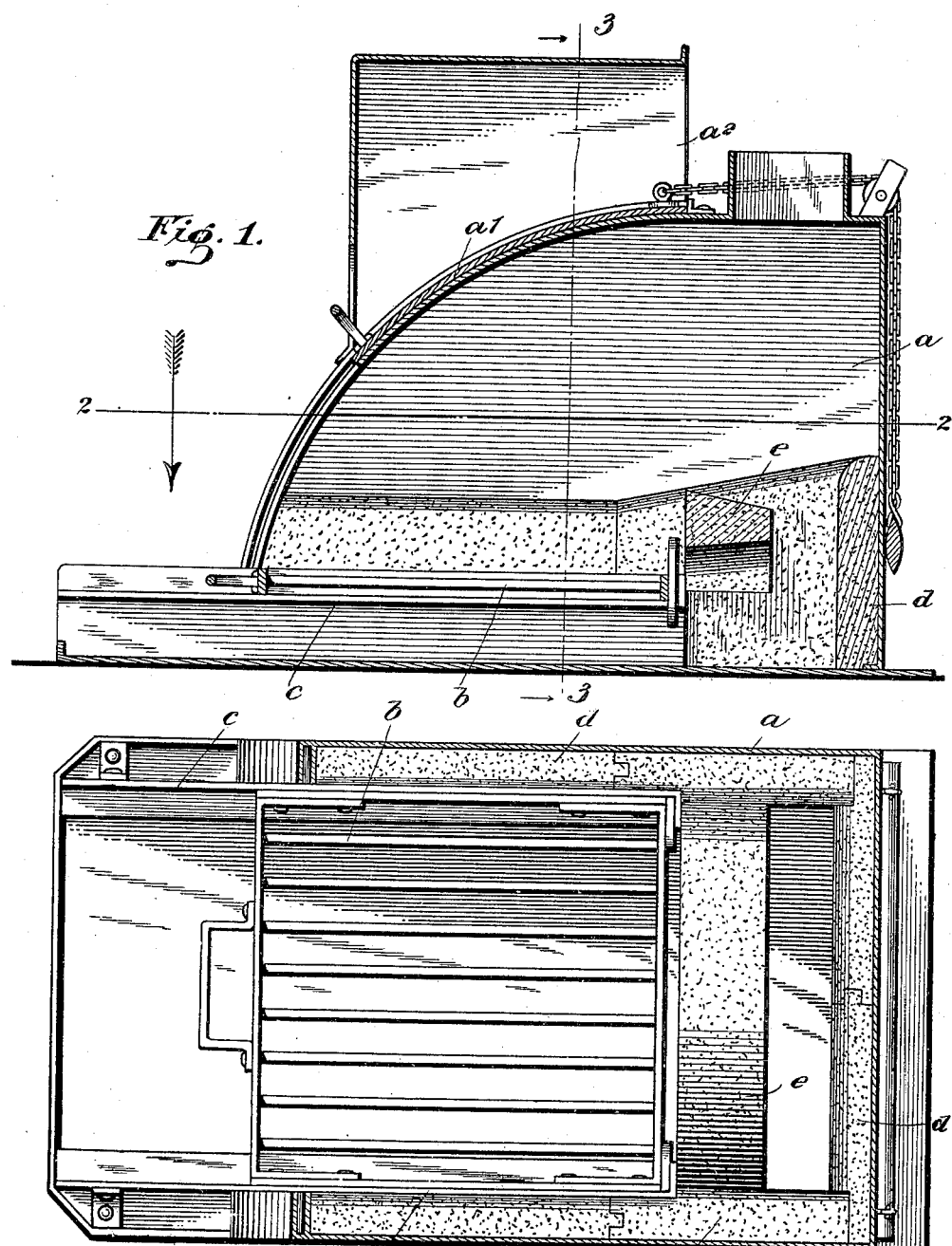

No. 679,130. Patented July 23, 1901.
A. TENU.
BROILER.
(Application filed Mar. 6, 1901.)
(No Model.) 2 Sheets—Sheet 1.

WITNESSES: INVENTOR
Adrien Tenu
BY
ATTORNEYS

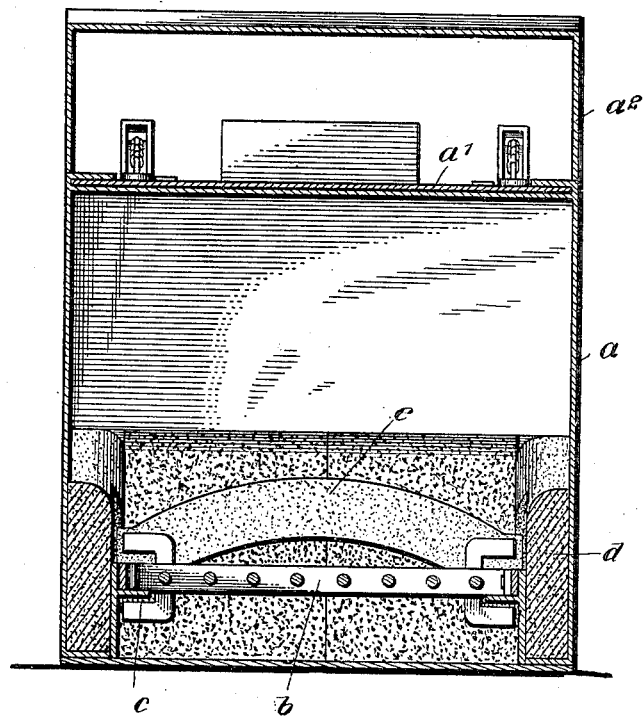

UNITED STATES PATENT OFFICE.

ADRIEN TENU, OF NEW YORK, N. Y.

BROILER.

SPECIFICATION forming part of Letters Patent No. 679,130, dated July 23, 1901.

Application filed March 6, 1901. Serial No. 50,021. (No model.)

*To all whom it may concern:*

Be it known that I, ADRIEN TENU, a citizen of the United States, and a resident of the city of New York, borough of Manhattan, in the county and State of New York, have invented a new and Improved Broiler, of which the following is a full, clear, and exact description.

This invention relates to broilers, such as are employed principally in hotels and restaurants to broil meats by charcoal and analogous fires contained in the broiler, as contradistinguished from broiling the meats over range or grate fires.

In the class of apparatus to which my invention relates it has been found by experience that the broiling-grate and the other parts adjacent thereto are so thoroughly exposed to the heat of the charcoal fire that they soon become destroyed; and it is the purpose of this invention to so construct the broiler that when it is not actually employed in broiling the meat the fire will be kept removed from the broiling-grate and the other destructible parts of the apparatus, thus materially lengthening the life of the broiler without in any way impairing the effective employment thereof.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a longitudinal section of the invention. Fig. 2 is a horizontal section looking down on the line 2 2 of Fig. 1, and Fig. 3 is a cross-section of the broiler on the line 3 3 of Fig. 1.

$a$ indicates the housing or casing of the broiler, which is of the usual construction and provided with a sliding cover $a'$ and hood $a^2$, all of which are common in the art. The broiling-grate $b$ is arranged to slide on tracks $c$, fitted horizontally in the broiler at a certain distance above the bottom or floor thereof. Instead of extending the tracks $c$ inward to the very back of the broiler and fitting the grate $b$ so that it will also move into such position when in use I shorten the tracks $c$, as shown in the drawings, and I place around the sides of the track and against the back of the broiler fire-brick linings $d$, which are raised upward from the floor of the broiler sufficiently to bear all of the hot coals which are placed therein, thus keeping them out of contact with the metallic walls of the broiler. At the inner ends of the tracks $c$ I arrange a fire-brick bridge $e$, which extends transversely across the broiler from one side to the other and against which the broiler-grate $b$ is adapted to be moved when in position for broiling.

In using this apparatus the grate is manipulated in the usual manner—that is to say, it is drawn out, so that the meat may be placed thereon, and it is then pushed back into the position shown in the drawings. The hot coals forming the fire are stacked up in the back part of the broiler between the fire-brick walls $d$ and against the bridge $e$. In this arrangement the coals are kept when the broiler is not in use. When the meat is placed on the grate, the coals are raked out forwardly, so that they will lie under the grate, and the meat can then be properly broiled. After the broiling operation the coals are pushed back under and against the rear side of the bridge $e$, which holds them in this position. The hot coals will then be out of the immediate vicinity of the tracks $c$ and grate $d$, so that these parts will not be injured by the heat of the coals.

Having thus described my invention, I claim as new and desire to secure by Letters Patent—

1. A broiler, having a casing, a grate arranged to slide horizontally therein the casing having a fire-space beneath the grate, and a bridge extended transversely across the broiler within the casing and arranged at the limit of the inward movement of the grate, the bridge serving to permit stacking the coals in the rear part of the broiler out of the vicinity of the grate, for the purpose specified.

2. A broiler, having a casing, a sliding grate therein the casing having a fire-space beneath the grate, a non-combustible lining arranged in the casing against the side and back walls thereof, and a bridge extended transversely across between the sides of the casing and within the same, the bridge being located at the limit of the inward movement of the grate to permit stacking the coals out of contact with the grate.

3. A broiler having a casing, a grate arranged to slide therein, the broiler having a fire-space under the grate, and a bridge arranged in the rear portion of the casing and serving to permit stacking the coals in such part of the casing out of the vicinity of the grate, for the purpose specified.

In testimony whereof I have signed my name to this specification in the presence of two subscribing witnesses.

ADRIEN TENU.

Witnesses:
 ARTHUR FURBER,
 SOL. DE YOUNG.